United States Patent
Huang et al.

(10) Patent No.: US 10,284,088 B1
(45) Date of Patent: May 7, 2019

(54) POWER CONVERSION DEVICE, TIME SIGNAL GENERATOR AND METHOD THEREOF

(71) Applicant: uPI Semiconductor Corp., Hsinchu County (TW)

(72) Inventors: Kun-Min Huang, Hsinchu County (TW); Chang-Yu Hung, Hsinchu County (TW)

(73) Assignee: uPI Semiconductor Corp., Hsinchu County (TW)

(*) Notice: Subject to any disclaimer, the term of this patent is extended or adjusted under 35 U.S.C. 154(b) by 0 days.

(21) Appl. No.: 15/910,018

(22) Filed: Mar. 2, 2018

(30) Foreign Application Priority Data

Oct. 17, 2017 (TW) .............................. 106135563 A

(51) Int. Cl.
*H02M 3/158* (2006.01)
*H02M 1/08* (2006.01)
*H02M 1/00* (2006.01)

(52) U.S. Cl.
CPC ............. *H02M 3/158* (2013.01); *H02M 1/08* (2013.01); *H02M 2001/0025* (2013.01)

(58) Field of Classification Search
CPC ........ H02M 3/155–3/1588; H02M 2001/0032; H02M 2001/0025; H02M 1/08; H02M 1/14
See application file for complete search history.

(56) References Cited

U.S. PATENT DOCUMENTS

| 7,652,461 | B2 | 1/2010 | Tateishi |
| 8,253,403 | B2 | 8/2012 | Chen et al. |
| 8,339,116 | B2 | 12/2012 | Huang et al. |
| 8,493,050 | B2 | 7/2013 | Miyamae |
| 8,664,929 | B2 | 3/2014 | Fan et al. |
| 8,742,745 | B2* | 6/2014 | Huang .................. H02M 3/156 323/285 |
| 8,896,284 | B2 | 11/2014 | Fan |
| 9,000,735 | B2* | 4/2015 | Huang .................. H02M 3/156 323/222 |
| 9,178,417 | B2* | 11/2015 | Huang .................... H02M 1/44 |
| 9,401,701 | B1* | 7/2016 | Huang ................ H03K 5/1565 |
| 9,467,044 | B2* | 10/2016 | Chen ..................... H02M 3/156 |
| 9,852,860 | B2* | 12/2017 | Hsiao ..................... H01H 47/00 |
| 9,991,775 | B1* | 6/2018 | Lin ......................... H02M 1/00 |
| 2009/0219003 | A1* | 9/2009 | Yang ................ H02M 3/33592 323/283 |
| 2010/0148741 | A1* | 6/2010 | Chen .................... H02M 3/158 323/285 |

(Continued)

*Primary Examiner* — Yusef A Ahmed
(74) *Attorney, Agent, or Firm* — JCIPRNET

(57) ABSTRACT

A time signal generator includes a time signal circuit and a timing circuit. The time signal circuit includes a current source and a current source circuit, and has a first mode and a second mode. The time signal generator provides a first on-time signal according to the current source in the first mode. The timing circuit is connected to the time signal circuit, and includes a first timing circuit. When the timing circuit counts to a first predetermined time, the first timing circuit provides a first control signal to the current source circuit, such that the time signal generator provides a second on-time signal according to the current source and the current source circuit in the second mode. A width of the second on-time signal is less than a width of the first on-time signal.

10 Claims, 4 Drawing Sheets

(56) References Cited

U.S. PATENT DOCUMENTS

| | | | | |
|---|---|---|---|---|
| 2012/0049824 A1* | 3/2012 | Chen | ............... | H02M 3/156 323/283 |
| 2012/0069611 A1* | 3/2012 | Yang | ............... | H02M 1/4225 363/44 |
| 2012/0268088 A1* | 10/2012 | Lee | ............... | H02M 3/1588 323/271 |
| 2012/0274294 A1* | 11/2012 | Lee | ............... | H02M 3/156 323/282 |
| 2013/0038301 A1* | 2/2013 | Ouyang | ............ | H02M 3/156 323/271 |
| 2014/0084885 A1* | 3/2014 | Ouyang | ............ | H02M 3/158 323/271 |
| 2014/0103896 A1* | 4/2014 | Lee | ............... | H02M 3/158 323/282 |
| 2014/0167716 A1* | 6/2014 | Chen | ............... | H02M 3/156 323/271 |
| 2014/0266111 A1* | 9/2014 | Lee | ............... | H02M 3/1584 323/282 |
| 2014/0340059 A1* | 11/2014 | Chen | ............... | H02M 3/156 323/271 |
| 2015/0077080 A1* | 3/2015 | Chen | ............... | H02M 3/156 323/282 |
| 2015/0318786 A1* | 11/2015 | Houston | ............ | H02M 1/15 323/271 |
| 2016/0172974 A1 | 6/2016 | Teh | | |
| 2017/0187282 A1* | 6/2017 | Wang | ............... | H02M 1/12 |
| 2017/0338738 A1* | 11/2017 | Sun | ............... | H02M 3/156 |
| 2017/0373596 A1* | 12/2017 | Huang | ............ | H02M 3/158 |

\* cited by examiner

POWER CONVERSION DEVICE, TIME SIGNAL GENERATOR AND METHOD THEREOF

CROSS-REFERENCE TO RELATED APPLICATION

This application claims the priority benefit of Taiwan application serial no. 106135563, filed on Oct. 17, 2017. The entirety of the above-mentioned patent application is hereby incorporated by reference herein and made a part of this specification.

TECHNICAL FIELD

The invention is related to a power conversion technology, and particularly to a power conversion device, a time signal generator and a method thereof.

DESCRIPTION OF RELATED ART

Generally speaking, a power conversion device generates a plurality of continuous on-time signals via a time signal generator to control power switch in a power output stage. In light load conditions, the power conversion device enters a discontinuous conduction mode (DCM) from a general mode, by extending the interval time between two adjacent on-time signals, power consumption is reduced and output stably. When the interval time between two adjacent on-time signals is over large, the signal frequency output by the time signal generator is similar to audio, and thus noise is generated. In order to avoid generation of noise, discontinuous conduction mode generally has a noise-cancelling function. In general mode, a constant-on-time signal is output, and the minimum-on-time signal is output in the discontinuous conduction mode. However, when the time signal generator keeps switching between the general mode and the discontinuous conduction mode, the time signal generator keeps outputting the constant-on-time signal and the minimum-on-time signal alternately, which causes the output voltage of the power conversion device to generate ripple, and thus and stability of the power conversion device is reduced.

SUMMARY OF INVENTION

The invention provides a power conversion device, a time signal generator and a method thereof, which may avoid that an output voltage of the power conversion device to generate ripple, thereby improving stability of the power conversion device.

A time signal generator of the invention includes a time signal circuit and a timing circuit. The time signal circuit includes a current source and a current source circuit, and has a first mode and a second mode. The time signal generator provides a first on-time signal according to the current source in the first mode. The timing circuit is connected to the time signal circuit, and includes a first timing circuit. When the timing circuit counts to a first predetermined time, the first timing circuit provides a first control signal to the current source circuit, such that the time signal generator provides a second on-time signal according to the current source and the current source circuit in a second mode. A width of the second on-time signal is smaller than a width of the first on-time signal.

A time signal generating method of the invention includes the following steps. In the first mode, a first on-time signal is provided according to a current source. When a first predetermined time is counted to, a first control signal is provided to a current source circuit, and a second on-time signal is provided according to the current source and the current source circuit in a second mode. A width of the second on-time signal is smaller than a width of the first on-time signal.

In the embodiment of the invention, a power conversion device includes a driving circuit, a power output stage, a feedback circuit and a time signal generator. The driving circuit generates a driving signal according to a time signal. The power output stage is electrically connected to the driving circuit and controlled by the driving signal such that power conversion device converts an input voltage into an output voltage. The feedback circuit is electrically connected to the power output stage and generates a time control signal according to the output voltage and a reference voltage. The time signal generator is electrically connected to a feedback circuit and the driving circuit, and includes a time signal circuit and a timing circuit. The time signal circuit includes a current source and a current source circuit, and has a first mode and a second mode. The time signal generator provides a first on-time signal according to the current source in the first mode. The timing circuit is connected to the time signal circuit and includes a first timing circuit. When the timing circuit counts to a first predetermined time, the first timing circuit provides a first control signal to the current source circuit such that the time signal generator provides a second on-time signal according to the current source and the current source circuit in the second mode. A width of the second on-time signal is smaller than a width of the first on-time signal.

In summary, the time signal circuit in the time signal generator of the invention includes the current source and the current source circuit. A noise-cancelling function can be provided in a light load mode such that the width of on-time is inversely proportional to the length of interval time. In this manner, it can be avoided that the output voltage of the power conversion device generates ripple, thereby improving stability of power conversion device.

In order to make the aforementioned features and advantages of the invention more comprehensible, embodiments accompanying figures are described in detail below.

DESCRIPTION OF EMBODIMENTS

Figure 1:
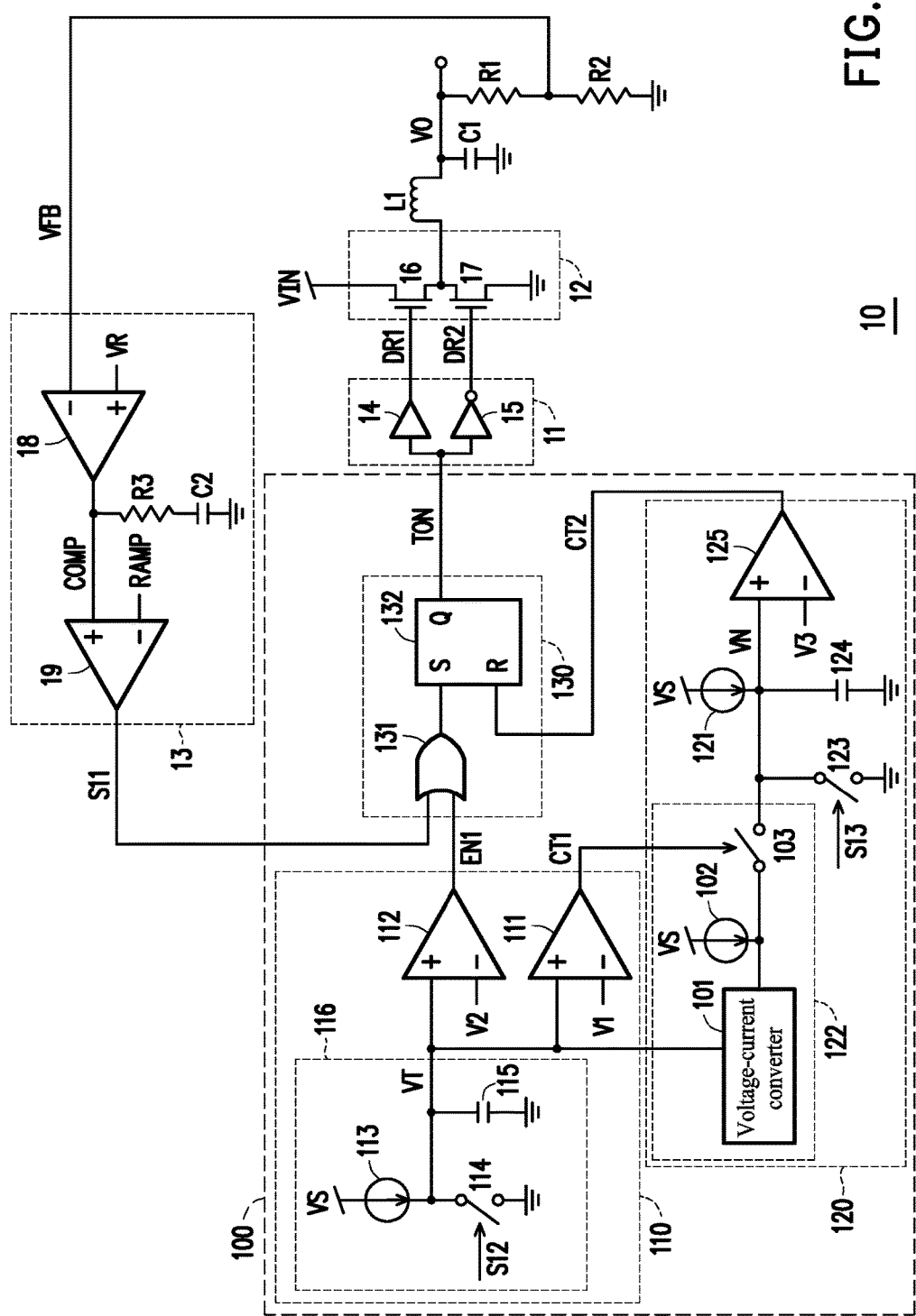
FIG. 1 is a schematic view of a power conversion device according to an embodiment of the invention.

FIG. 1 is a schematic view of a power conversion device according to an embodiment of the invention. As shown in FIG. 1, a power conversion device 10 includes a time signal generator 100, a driving circuit 11, a power output stage 12, an impedance circuit consisting of an inductor L1 and a capacitor C1, resistances R1-R2 and a feedback circuit 13. The time signal generator 100 may generate an on-time signal TON. The driving circuit 11 is electrically connected to the time signal generator 100 and may generate a plurality of driving signals DR1-DR2 in response to the on-time signal TON. The power output stage 12 is electrically connected to the driving circuit 11, and may control the current flowing through the inductor L1 and capacitor C1 in response to the driving signals DR1-DR2. In this manner, the power conversion device 10 may convert an input voltage VIN into an output voltage VO.

The driving circuit 11 includes a buffer 14 and an inverter 15, and the power output stage 12 includes power switches 16-17. The buffer 14 may generate a driving signal DR1 according to the on-time signal TON to control the on-state of the power switch 16. The inverter 15 may generate a driving signal DR2 according to the on-time signal TON to control the on-state of the power switch 17. Along with change of the on-state of the power switches 16-17, the current flowing through the inductor L1 is also changed correspondingly, and the capacitor C1 also generates corresponding charging action or discharging action such that the input voltage VIN can be converted into output voltage VO.

A feedback circuit 13 is electrically connected to the power output stage 12 via resistances R1-R2 as well as the impedance circuit, and generates a time control signal Si 1 according to an output voltage VO and a reference voltage VR. The feedback circuit 13 may include an error amplifier 18, a comparator 19, a compensation resistance R3 and a compensation capacitor C2. The resistances R1 and R2 are serially connected between the output voltage VO and a ground end, and the resistances R1 and R2 may be formed into a dividing circuit to generate a feedback voltage VFB related to the output voltage VO. The error amplifier 18 may generate an error signal COMP according to the feedback voltage VFB and the reference voltage VR. The comparator 19 compares the error signal COMP with a saw-tooth wave signal RAMP and generates the time control signal S11 accordingly.

The time signal generator 100 is electrically connected to the feedback circuit 13 and the driving circuit 11, and including a timing circuit 110, a time signal circuit 120 and a logic circuit 130. The time signal circuit 120 is electrically connected to the timing circuit 110 and the logic circuit 130, and the time signal circuit 120 includes a current source 121 and a current source circuit 122. The time signal generator 100 includes a first mode and a second mode. In the first mode (e.g., general mode), the time signal generator 100 may provide a first on-time signal according to current source 121. In the second mode (e.g., discontinuous conduction mode having noise-cancelling function), the time signal generator 100 may provide a second on-time signal according to the current source 121 and the current source circuit 122.

The timing circuit 110 includes a first timing circuit 111. When the timing circuit 110 counts to a first predetermined time (e.g., 10 us), the first timing circuit 111 may provide a first control signal CT1 to the current source circuit 122, such that the time signal generator 100 provides the second on-time signal according to the current source 121 and the current source circuit 122 in the second mode. A width of the second on-time signal is smaller than a width of the first on-time signal.

In other words, in the first mode (e.g., general mode), the time signal generator 100 may generate an on-time signal (e.g., first on-time signal) with a constant width according to the current source 121. In addition, in the second mode (e.g., the discontinuous conduction mode having noise-cancelling function), the time signal generator 100 may generate the on-time signal (e.g., second on-time signal) with a variable width using the current source circuit 122. In this manner, even if the time signal generator 100 keeps switching between the first mode (e.g., general mode) and the second mode (e.g., discontinuous conduction mode having noise-cancelling function), it still can be avoided that the output voltage VO of the power conversion device 10 generates ripple, thereby improving stability of the power conversion device 10.

Figure 2:
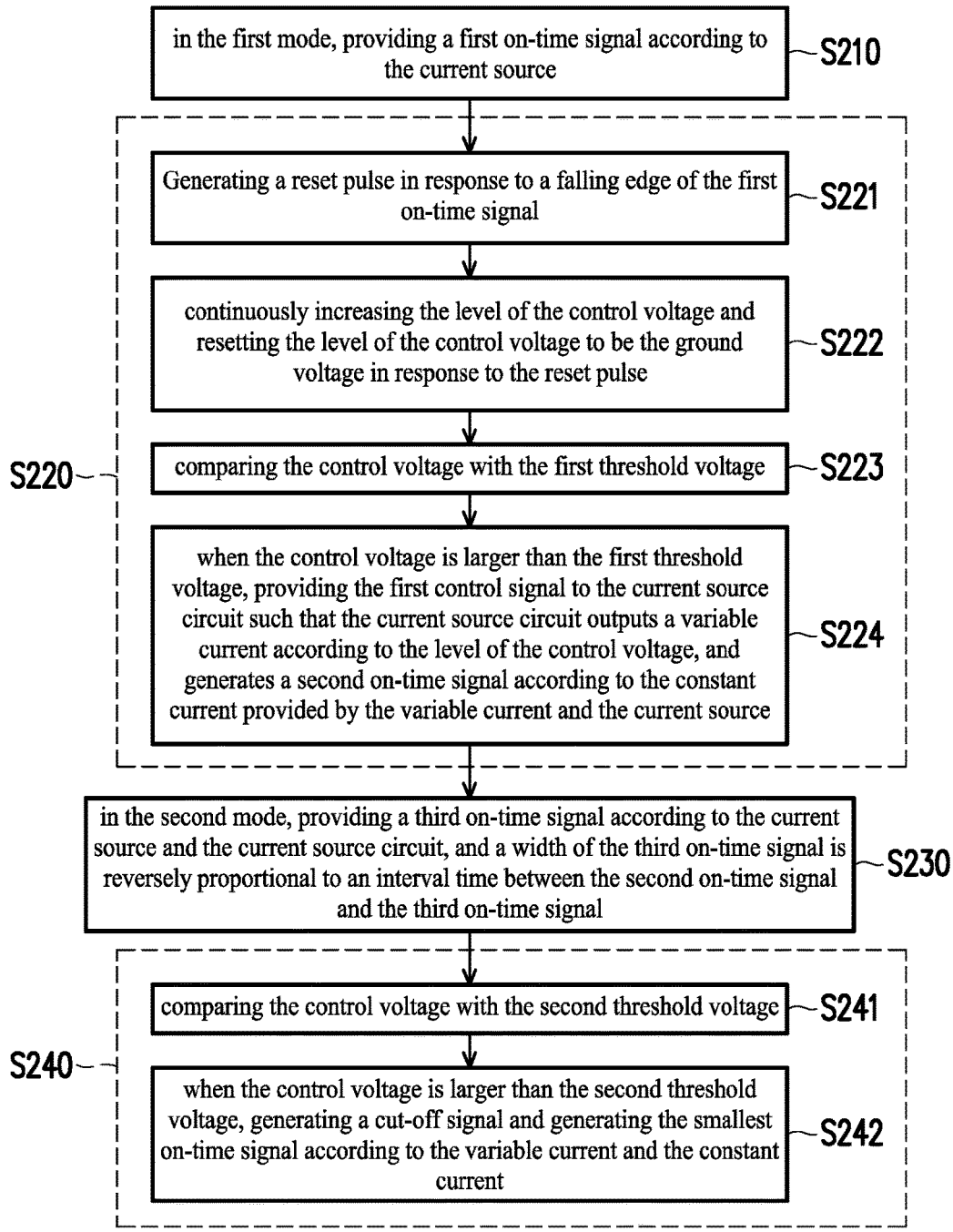
FIG. 2 is a flowchart of a time signal generating method according to an embodiment of the invention.
Figure 3:
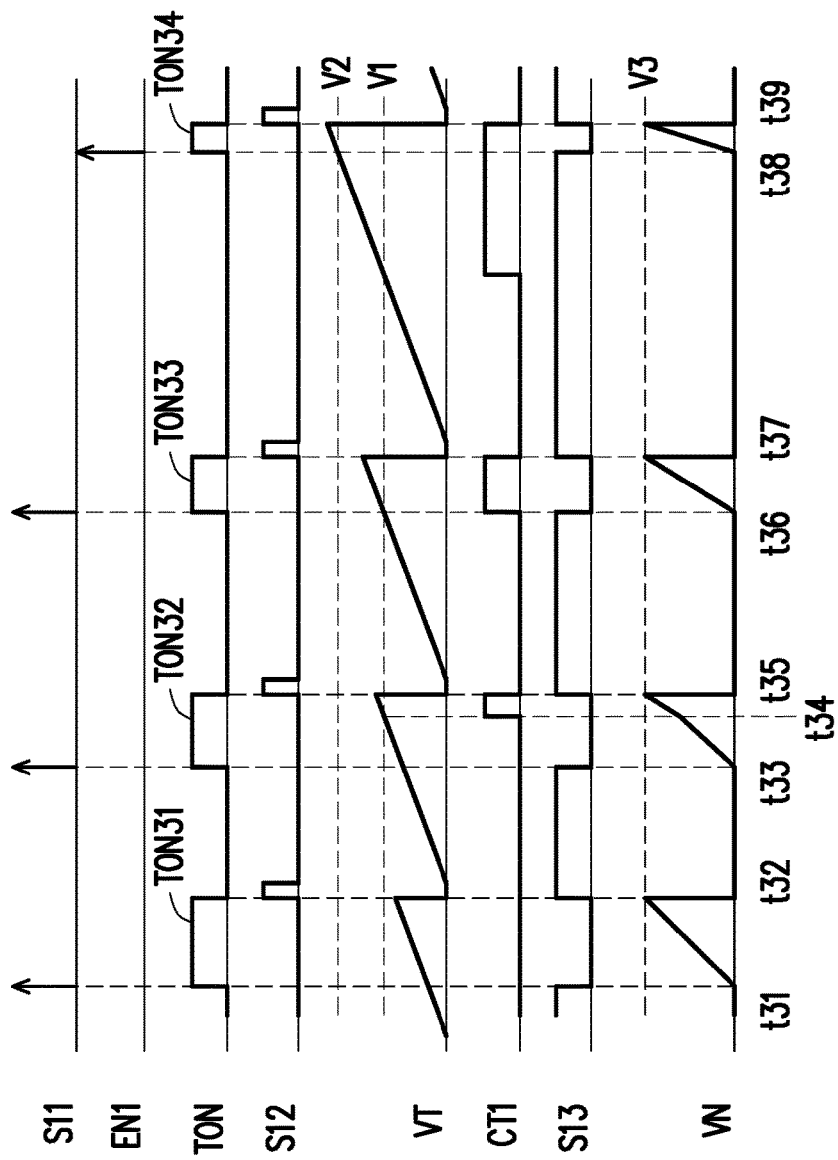
FIG. 3 is a time chart describing a time signal generator in FIG. 1.

FIG. 2 is a flowchart of a time signal generating method according to an embodiment of the invention. FIG. 3 is a time chart describing a time signal generator in FIG. 1. The following paragraph further describes the operation of the time signal generator 100 with reference to FIG. 1 to FIG. 3. As shown in FIG. 1, the timing circuit 110 further includes a second timing circuit 112, a current source 113, a switch 114 and a capacitor 115. The current source 113 and the switch 114 are serially connected between a power voltage VS and the ground end. The capacitor 115 and the switch 114 are connected to each other in parallel. The first timing circuit 111 and the second timing circuit 112 may be constructed respectively via a comparator. As respect of operation, the current source 113, the switch 114 and the capacitor 115 may be formed into a charging/discharging circuit 116. When the switch 114 is turned off, the constant current provided by the current source 113 may charge the capacitor 115, thereby continuously increasing the level of the control voltage VT stored by the capacitor 115. The first timing circuit 111 receives and compares the control voltage VT with a first threshold voltage V1, and the second timing circuit 112 receives and compares the control voltage VT with a second threshold voltage V2.

Figure 4:
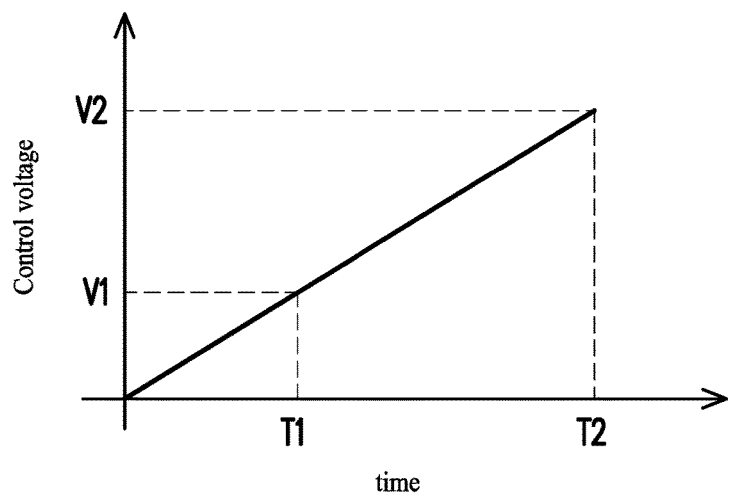
FIG. 4 is a time chart describing a control voltage according to an embodiment of the invention.

FIG. 4 is a time chart describing a control voltage according to an embodiment of the invention. As shown in FIG. 4, a time during which the control voltage VT is risen from the ground voltage to the first threshold voltage V1 is equal to a first predetermined time T1 (e.g., 10 us), and a time during which the control voltage VT is risen from the ground voltage to the second threshold voltage V2 is equal to a second predetermined time T2 (e.g., 30 us). In this manner, when the control voltage VT is larger than the first threshold voltage V1, it represents that the timing circuit 110 counts to the first predetermined time T1. In addition, when the control voltage VT is larger than the second threshold voltage V2, it represents that the timing circuit 110 counts to the second predetermined time T2. That is to say, the first timing circuit 111 may be used to determine whether the counting time reaches the first predetermined time T1, and the second timing circuit 112 may be used to determine whether the counting time reaches the second predetermined time T2.

The time signal circuit 120 further includes a switch 123, a capacitor 124 and a comparator 125. The switch 123 is electrically connected between the current source circuit 122 and the ground end. The capacitor 124 is electrically connected to the current source 121 and the switch 123. A comparator 125 receives a third threshold voltage V3 and electrically connected to the capacitor 124. As respect of operation, the switch 123 is controlled by an inverting signal S13 of the on-time signal TON. When the switch 123 is turned off, the time signal circuit 120 may use the current source 121 or use both of the current source 121 and the current source circuit 122 to charge the capacitor 124, such that the level of the charging voltage VN stored by the capacitor 124 can rise continuously. The comparator 125 may receive and compare the charging voltage VN with the third threshold voltage V3, and generate a second control signal CT2 when the charging voltage VN is larger than the third threshold voltage V3. When the switch 123 is turned on, the time signal circuit 120 may reset the level of the charging voltage VN to be the ground voltage.

The current source circuit 122 includes a voltage-current converter 101, a current source 102 and a switch 103. As respect of operation, the voltage-current converter 101 may convert the control voltage VT into an adjusting current. The current source circuit 122 may generate a variable current that is proportional to the control voltage VT according to a constant current generated by the adjusting current and the current source 102. In another embodiment, persons having ordinary skill in the art may selectively remove the current source 102 according to the need of design, and directly use the adjusting current generated by the voltage-current converter 101 to form the variable current that is proportional to the control voltage VT. In addition, the current source circuit 122 may determine whether to output the variable current in response to whether the switch 103 is turned on or not. The logic circuit 130 includes an OR gate 131 and an SR latch 132. The OR gate 131 is electrically connected to the second timing circuit 112 and the feedback circuit 13. The SR latch 132 is electrically connected to the OR gate 131 and the comparator 125. The SR latch 132 generates the on-time signal TON.

Referring to FIG. 1 to FIG. 3, as shown in step S210, in the first mode, the time signal generator 100 may provide a first on-time signal TON31 according to the current source 121. For example, the logic circuit 130 may start outputting the first on-time signal TON31 in response to the time control signal S11 at a time point t31, that is, to control a rising edge of the first on-time signal TON31. During time points t31 and t32, the charging/discharging circuit 116 in the timing circuit 110 may continuously increase the level of the control voltage VT in response to the turned-off state of the switch 114. On the other hand, the time signal circuit 120 may charge the capacitor 124 using the constant current provided by the current source 121 in response to the turned-off state of the switch 123 and the switch 103.

At time point t32, the level of the charging voltage VN rises to the third threshold voltage V3; therefore the comparator 125 outputs the second control signal CT2. The logic circuit 130 may stop outputting the first on-time signal TON31 in response to the second control signal CT2, that is, to control a falling edge of the first on-time signal TON31. In other words, in the first mode, the time signal generator 100 may control the rising edge of the first on-time signal TON31 according to the time control signal S11, and control the falling edge of the first on-time signal TON31 according to the constant current provided by the current source 121.

As shown in step S220, when the first predetermined time T1 is counted to, the time signal generator 100 may provide the first control signal CT1 to the current source circuit 122, and provides the second on-time signal TON32 according to the current source 121 and the current source circuit 122 in the second mode. In terms of detailed steps of step S220, as shown in step S221, the time signal generator 100 may generate a reset pulse S12 at the time point t32 in response to the falling edge of the first on-time signal TON31. As shown in step S222, the switch 114 in the charging/discharging circuit 116 may be turned on in response to the reset pulse S12, such that the level of the control voltage VT is reset to be the ground voltage. In addition, when the time signal generator 100 stops generating the reset pulse S12, the charging/discharging circuit 116 continuously increases the level of the control voltage VT. In other words, the charging/discharging circuit 116 may continuously increase the level of the control voltage VT and reset the level of the control voltage VT to be the ground voltage in response to the reset pulse S12.

As shown in step S223, the first timing circuit 111 may compare the control voltage VT with the first threshold voltage V1 to determine whether the counting time reaches the first predetermined time T1. As shown in step S224, when the control voltage VT is larger than the first threshold voltage V1, it represents that the timing circuit 110 counts to the first predetermined time T1. At this time, the first timing circuit 110 may provide the first control signal CT1 to the current source circuit 122 to turn on the switch 103 in the current source circuit 122. In this manner, the current source circuit 122 may output the variable current that is proportional to the control voltage VT, such that the time signal generator 100 may generate the second on-time signal TON32 according to the constant current provided by the variable current and the current source 121, that is, to control the falling edge of the second on-time signal TON32 according to the constant current and the variable current.

Specifically, the logic circuit 130 may start outputting the second on-time signal TON32 in response to the time control signal S11 at a time point t33, that is, to control the rising edge of the second on-time signal TON32. During the time points t33 and t34, the time signal circuit 120 may charge the capacitor 124 using the constant current provided by the current source 121 first. Then, during time points t34 and t35, the time signal current 120 may charge the capacitor 124 using the constant current and the variable current. In this manner, as compared with the charging voltage VN during the time points t31 and t32, the charging voltage VN during the time point t33 and the time point t35 can reach the third threshold voltage V3 more quickly, such that the width of the second on-time signal TON32 is smaller than the width of the first on-time signal TON31. That is to say, in the second mode, the time signal generator 100 may control the rising edge of the second on-time signal TON32 according to the time control signal S11, and control the falling edge of the second on-time signal TON32 according to the variable current provided by the current source circuit 122 and the constant current provided by the current source 121.

As shown in step S230, in the second mode, the time signal generator 100 may further provide a third on-time signal TON33 according to the current source 121 and the current source circuit 122. The third on-time signal TON33 follows the second on-time signal TON32. In other words, in the second mode, the time signal generator 100 may provide the second on-time signal TON32 and the third on-time signal TON33 in sequence according to the current source 121 and the current source circuit 122.

The timing circuit 110 may reset the level of the control voltage VT to be the ground voltage in response to the reset pulse S12 at the time point t35 to start calculating the interval time between the second on-time signal TON32 and the third on-time signal TON33. The logic circuit 130 may start outputting the third on-time signal TON33 in response to the time control signal S11 at a time point t36, that is, to control the rising edge of the third on-time signal TON33. In addition, during time points t36 and t37, the switch 123 and the switch 103 in the time signal circuit 120 may be turned on together, such that the time signal circuit 120 may charge the capacitor 124 using the constant current and the variable current. In this manner, as compared with the charging voltage VN during the time point t33 and the time point t35, the charging voltage VN during the time point t36 and the time point t37 can reach the third threshold voltage V3 more quickly, such that the width of the third on-time signal TON33 is smaller than the width of the second on-time signal TON32.

As shown in step S240, when the second predetermined time T2 is counted to, the time signal generator 100 may generate a cut-off signal EN1 and provides the minimum-on-time signal TON34. In terms of detailed steps of step S240, as shown in step S241, the second timing circuit 112 may compare the control voltage VT with the second threshold voltage V2 to determine whether the counting time reaches the second predetermined time T2. As shown in step S242, when the control voltage VT is larger than the second threshold voltage V2, it represents that the timing circuit 110 counts to the second predetermined time T2. At this time, the second timing circuit 112 may generate the cut-off signal EN1 such that the logic circuit 130 may start outputting the minimum-on-time signal TON34 in response to the cut-off signal EN1, that is, to control the rising edge of the minimum-on-time signal TON34.

During time points t38 and t39, the time signal circuit 120 may charge the capacitor 124 using the constant current and the variable current. Since the control voltage VT during the time points t38 and t39 is larger than the control voltage VT during the time points t36 and t37, the variable current generated during time points t38 and t39 by the current source circuit 112 is larger than the variable current generated during the time points t36 and t37. In this manner, as compared with the charging voltage VN during the time points t36 and t37, the charging voltage VN during the time points t38 and t39 can reach the third threshold voltage V3 more quickly, such that the width of the minimum-on-time signal TON34 can be smaller than the width of the third on-time signal TON33.

Figure 5:
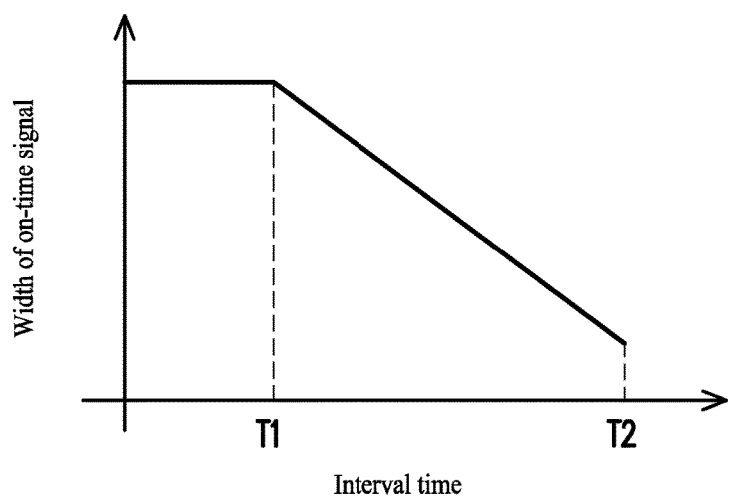
FIG. 5 is a schematic view illustrating a width of an on-time signal relative to an interval time according to an embodiment of the invention.

FIG. 5 is a schematic view illustrating a width of an on-time signal relative to an interval time according to an embodiment of the invention. As shown in FIG. 5, when the interval time between the current on-time signal (e.g., the second on-time signal TON32) and the previous on-time signal (e.g., first on-time signal TON31) is larger than the first predetermined time T1, the time signal circuit 120 may enter the second mode. In the second mode, the time signal circuit 120 may accelerate the boosting speed of the charging voltage VN using the current source circuit 122, thereby reducing the width of the current on-time signal.

In terms of the two on-time signals (e.g., the second on-time signal TON32 and the third on-time signal TON33) generated in sequence in the second mode by the time signal generator 100, the current source circuit 122 may adjust the boosting speed of the charging voltage VN using the variable current that is proportional to the control voltage VT, such that the width of the current on-time signal (e.g., third on-time signal TON33) may be reversely proportional to the interval time between the current on-time signal and the previous on-time signal (e.g., third on-time signal TON33). In other words, in the second mode, the width of the current on-time signal becomes smaller linearly along with the increase of time interval.

Within the second predetermined time T2 at which the previous on-time signal is received, if the time signal generator 100 does not receive the time control signal S11 from the feedback circuit 13, the time signal generator 100 outputs the minimum-on-time signal using the cut-off signal EN1 and the second control signal CT2. In other words, when the time signal generator 100 stops outputting the on-time signal for a time period to the second predetermined time T2, the time signal generator 100 is forced to output the minimum-on-time signal.

In summary, according to the invention, the time signal circuit in the time signal generator includes the current source and the current source circuit. In the first mode, the time signal generator may provide the first on-time signal according to the current source. In the second mode, the time signal generator provides the second on-time signal according to the current source and the current source circuit, and adjusts the width of the second on-time signal using the variable current that is proportional to the control voltage. In this manner, it can be avoided that the output voltage of the power conversion device generates ripple, thereby improving the stability of the current conversion device.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A time signal generator, comprising:
   a time signal circuit, comprising a current source and a current source circuit, and having a first mode and a second mode, wherein the time signal generator provides a first on-time signal according to the current source in the first mode; and
   a timing circuit, connected to the time signal circuit, and comprising a first timing circuit, wherein when the timing circuit counts to a first predetermined time, the first timing circuit provides a first control signal to the current source circuit, such that the time signal generator provides a second on-time signal and a third on-time signal in sequence according to the current source and the current source circuit in the second mode, wherein a width of the second on-time signal is smaller than a width of the first on-time signal, and a width of the third on-time signal is reversely proportional to an interval time between the second on-time signal and the third on-time signal,
   wherein the timing circuit further comprises a second timing circuit, and when the timing circuit counts to a second predetermined time, the second timing circuit generates a cut-off signal such that the time signal generator provides a minimum-on-time signal.

2. The time signal generator according to claim 1, wherein the time signal generator generates a reset pulse in response to a falling edge of the first on-time signal, and the timing circuit further comprises:
   a charging/discharging circuit, increasing a level of a control voltage continuously, and resetting the level of the control voltage to be a ground voltage in response to the reset pulse,
   wherein the first timing circuit compares the control voltage with a first threshold voltage, and outputs the first control signal when the control voltage is larger than the first threshold voltage, and the second timing circuit compares the control voltage with a second threshold voltage, and outputs the cut-off signal when the control voltage is larger than the second threshold voltage.

3. The time signal generator according to claim 2, wherein a time during which the control voltage is risen from the ground voltage to the first threshold voltage is equal to the first predetermined time, and a time during which the control voltage is risen from the ground voltage to the second threshold voltage is equal to the second predetermined time.

4. The time signal generator according to claim 2, wherein the time signal circuit further comprises:
a switch, electrically connected between the current source circuit and a ground end, and controlled by an inverting signal of the second on-time signal;
a capacitor, electrically connected to the current source and the switch; and
a comparator, receiving a third threshold voltage and electrically connected to the capacitor, wherein the current source circuit adjusts a variable current according to a level of the control voltage, and outputs the variable current in response to the first control signal, such that the comparator generates a second control signal according to the variable current and a constant current provided by the current source.

5. A time signal generating method, comprising:
in a first mode, providing a first on-time signal according to a current source;
when a first predetermined time is counted to, providing a first control signal to a current source circuit, and providing a second on-time signal and a third on-time signal in sequence according to the current source and the current source circuit in a second mode; and
when a second predetermined time is counted to, generating a cut-off signal and providing a minimum-on-time signal,
wherein a width of the second on-time signal is smaller than a width of the first on-time signal, and a width of the third on-time signal being reversely proportional to an interval time between the second on-time signal and the third on-time signal.

6. The time signal generating method according to claim 5, wherein the step of providing the first control signal to the current source circuit and providing the second on-time signal according to the current source and the current source circuit in the second mode comprises:
generating a reset pulse in response to a falling edge of the first on-time signal;
increasing a level of a control voltage continuously, and resetting the level of the control voltage to be a ground voltage in response to the reset pulse;
comparing the control voltage with a first threshold voltage; and
when the control voltage is larger than the first threshold voltage, providing the first control signal to the current source circuit, such that the current source circuit outputs a variable current according to the level of the control voltage, and generating the second on-time signal according to the variable current and a constant current provided by the current source.

7. The time signal generating method according to claim 6, wherein the step of generating the cut-off signal and providing the minimum-on-time signal comprises:
comparing the control voltage with a second threshold voltage; and
when the control voltage is larger than the second threshold voltage, generating the cut-off signal, and generating the minimum-on-time signal according to the variable current and the constant current.

8. A power conversion device, comprising:
a driving circuit, generating a plurality of driving signals according to a time signal;
a power output stage, electrically connected to the driving circuit and controlled by the driving signals such that the power conversion device converts an input voltage into an output voltage;
a feedback circuit, electrically connected to the power output stage, and generating a time control signal according to the output voltage and a reference voltage; and
a time signal generator, electrically connected to the feedback circuit and the driving circuit, and comprising:
a time signal circuit, comprising a current source and a current source circuit, and having a first mode and a second mode, wherein the time signal generator provides a first on-time signal according to the current source in the first mode; and
a timing circuit, connected to the time signal circuit and comprising a first timing circuit, wherein when the timing circuit counts to a first predetermined time, the first timing circuit provides a first control signal to the current source circuit, such that the time signal generator provides a second on-time signal and a third on-time signal in sequence according to the current source and the current source circuit in the second mode, wherein a width of the second on-time signal is smaller than a width of the first on-time signal, and a width of the third on-time signal is reversely proportional to an interval time between the second on-time signal and the third on-time signal,
wherein the timing circuit further comprises a second timing circuit, and when the timing circuit counts to a second predetermined time, the second timing circuit generates a cut-off signal, such that the time signal generator provides a minimum-on-time signal.

9. The power conversion device according to claim 8, wherein the time signal generator generates a reset pulse in response to a falling edge of the first on-time signal, and the timing circuit further comprises:
a charging/discharging circuit, increasing a level of a control voltage continuously, and resetting the level of the control voltage to be a ground voltage in response to the reset pulse,
wherein the first timing circuit compares the control voltage with a first threshold voltage, and outputs the first control signal when the control voltage is larger than the first threshold voltage, and the second timing circuit compares the control voltage with a second threshold voltage, and outputs the cut-off signal when the control voltage is larger than the second threshold voltage.

10. The power conversion device according to claim 9, wherein a time during which the control voltage is risen from the ground voltage to the first threshold voltage is equal to the first predetermined time, and a time during which the control voltage is risen from the ground voltage to the second threshold voltage is equal to the second predetermined time.

* * * * *